(12) United States Patent
Yoon

(10) Patent No.: US 6,186,182 B1
(45) Date of Patent: Feb. 13, 2001

(54) DOUBLE-WALLED SPIRAL PIPE

(75) Inventor: Seung-Kyu Yoon, Jeonrabook-do (KR)

(73) Assignee: Seongho CSP., Ltd., Jeonrabook-Do (KR)

( * ) Notice: Under 35 U.S.C. 154(b), the term of this patent shall be extended for 0 days.

(21) Appl. No.: 09/409,608

(22) Filed: Oct. 1, 1999

(30) Foreign Application Priority Data

Jan. 8, 1998 (KR) .................................................... 98-105

(51) Int. Cl.$^7$ .................................................... F16L 11/11
(52) U.S. Cl. ........................... 138/122; 138/144; 138/121
(58) Field of Search .................................. 138/121, 122, 138/141, 144, 173, 177

(56) References Cited

U.S. PATENT DOCUMENTS

| | | | | |
|---|---|---|---|---|
| 2,898,941 | * | 8/1959 | Kilcup .................................. | 138/121 |
| 3,330,303 | * | 7/1967 | Fochler ............................. | 138/121 X |
| 4,487,232 | * | 12/1984 | Kanao .................................. | 138/122 |
| 5,058,934 | * | 10/1991 | Brannon ............................. | 138/121 X |
| 5,548,093 | * | 8/1996 | Sato et al. ......................... | 138/121 X |
| 5,727,599 | * | 3/1998 | Fisher et al. ......................... | 138/156 |

\* cited by examiner

*Primary Examiner*—Patrick Brinson
(74) *Attorney, Agent, or Firm*—Thomas R. Vigil

(57) ABSTRACT

A double-walled spiral pipe in accordance with the present invention is composed of an outer wall 10 having a cylindrical shape, which is prepared by winding spirally a coated steel plate 11 having corrugations 12; and an inner wall 20 having a cylindrical shape, which is contacted with the wave bottom of corrugations of said outer wall 10, and can contracted or elongated depending upon a change of the pitch of the corrugations of said outer wall 10.

The inner wall 20 having a cylindrical configuration is installed to be contacted with the wave bottom of corrugations of the outer wall 10, and functions to drain a sewage, etc. The inner wall 20 has a semi-circular portion which is formed at the point of the wave bottom of the corrugations of the outer wall, and a plane surface is formed between the semi-circular portions. Accordingly, although corrugations 12 of the outer wall 10 can be easily deformed depending upon a sectional load or soil pressure or heat, by which a pitch of the corrugations 12 can be wide or narrow, the semi-circular portion 22a of the inner wall 20 is flattened, thereby the inner wall 20 is prevented from a damage or breakage caused by outer factors.

3 Claims, 7 Drawing Sheets

DOUBLE-WALLED SPIRAL PIPE

FIELD OF THE INVENTION

The present invention relates to a double-walled spiral pipe for the use of a drainage. More particularly, the present invention relates to a double-walled spiral pipe which can prevent a damage or breakage thereof by a flexibility of the inner wall in case that the outer wall is deformed.

BACKGROUND OF THE INVENTION

A spiral pipe has been widely used as a drainage in order to drain sewage, buried under the ground. A conventional spiral pipe has a spirally corrugated shape, and the structural strength thereof is good against load and impact. But, there is a disadvantage such that sewage can not be drained smoothly through the conventional spiral pipe due to the corrugations. In order to solve the shortcomings of the conventional spiral pipe, a spiral pipe with double walls has been developed.

As shown in FIG. 1A, a conventional spiral pipe is composed of an outer wall 1 which is prepared by winding spirally a steel plate 1a having corrugations 1b to thereby have a cylindrical configuration and an inner wall 2 having a cylindrical configuration, which contacts with the wave bottom of the corrugations of the outer wall 1. In a double-walled spiral pipe, the outer wall 1 having corrugations functions as a structure to resist against load and soil pressure, and the inner wall 2 having a plane surface, which is united with the wave bottom of the outer wall 1 along the inner surface of the corrugated spiral pipe. Therefore, the inner wall 2 functions to smoothly flow a sewage therethrough, and also a solid structure and an improved drainage capacity thereof can be expected.

As shown in FIG. 1B, in case that corrugations of the outer wall 1 are deformed due to load, soil pressure or heat, a pitch of corrugations of the spiral pipe can become wide or narrow, therefore a tensile force or compressive force are given to the inner wall 2. Relatively, the inner wall 2 having a poor resistance to a tensile force or compressive force can be easily damaged and also detached from the outer wall 1.

Also, since a corrugated surface 1b of the outer wall 1 is deformed depending upon heat, the inner wall 2 is repeatedly contracted and elongated. Therefore, a junction portion between the wave bottom of the corrugations of the outer wall 1 and the inner wall 2 can be broken.

As illustrated in above, the conventional double-walled spiral pipe has shortcomings that the outer wall can be easily deformed depending upon a sectional load and soil pressure, thereby the durability of the spiral pipe is reduced, and a sewage can not be drained smoothly through the inner pipe of the spiral pipe due to the deposit which is caused by the inflow of impurities or soil, and the inner wall can be damaged and detached from the outer wall depending upon heat.

OBJECTS OF THE INVENTION

An object of the present invention is to provide a double-walled spiral pipe which can prevent the breakage or damage of the inner wall by active contraction and elongation, and also can lengthen the life span thereof.

Another object of the present invention is to provide a double-walled spiral pipe which can smoothly drain a sewage therethrough.

These and other objects will appear upon reading the following specification and claims and upon considering in connection therewith the attached drawing to which they relate.

SUMMARY OF THE INVENTION

A double-walled spiral pipe in accordance with the present invention is composed of an outer wall 10 having a cylindrical shape, which is prepared by means of winding spirally a coated steel plate 11 having corrugations 12; and an inner wall 20 having a cylindrical shape, which is contacted with the wave bottom of corrugations of said outer wall 10, and can contracted or elongated depending upon a change of the pitch of the corrugations of said outer wall 10.

The inner wall 20 having a cylindrical configuration is installed to be contacted with the wave bottom of corrugations of the outer wall 10, and functions to drain a sewage, etc. The inner wall 20 has a semi-circular portion 22a at the point of the wave bottom of the corrugations 12 of the outer wall, and a plane surface 22b is formed between the semi-circular portions 22a. Accordingly, although corrugations 12 of the outer wall 10 can be easily deformed depending upon a sectional load or soil pressure or heat, by which a pitch of the corrugations 12 can be wide or narrow, the semi-circular portion 22a of the inner wall 20 is flattened, thereby the inner wall 20 is prevented from a damage or breakage caused by outer factors.

BRIEF DESCRIPTION OF THE DRAWINGS

In the drawing in which a preferred embodiment of the present invention is disclosed.

DETAILED DESCRIPTION OF THE INVENTION

The present invention will be described with reference to the accompanying drawings.

A corrugated spiral pipe in accordance with the present invention is composed of an outer wall 10 having a cylindrical shape, which is prepared by winding spirally a coated steel plate 11 having corrugations 12, and an inner wall 20 which is contacted with the inner surface of the outer wall 10.

Figure 1A:
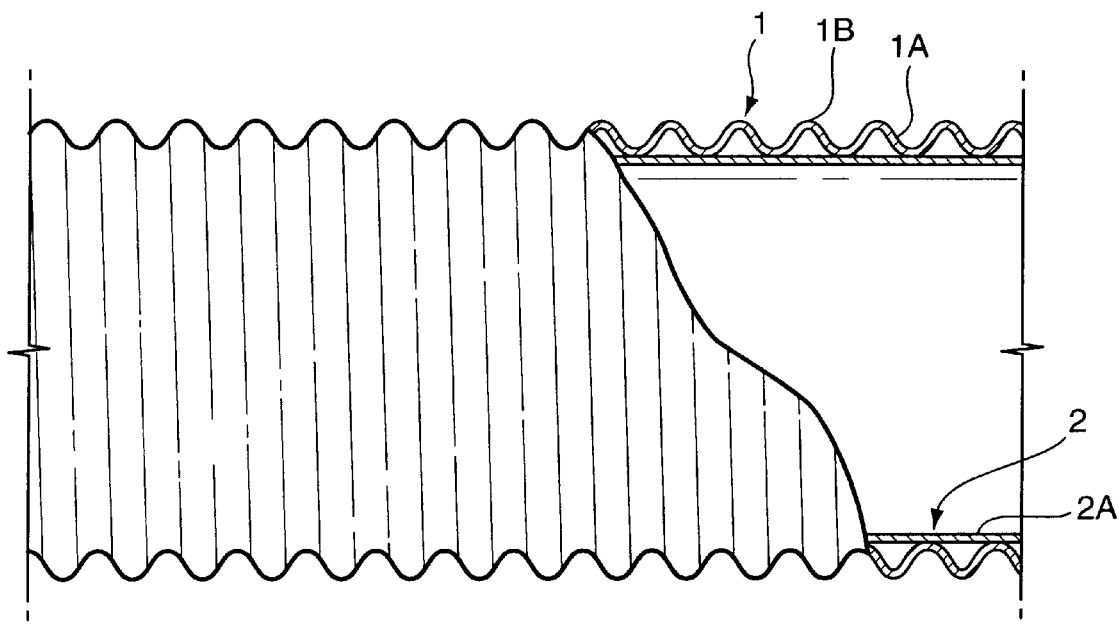
FIG. 1a is a front view, including a partially sectional portion, of a conventional double-walled spiral pipe.
Figure 1B:
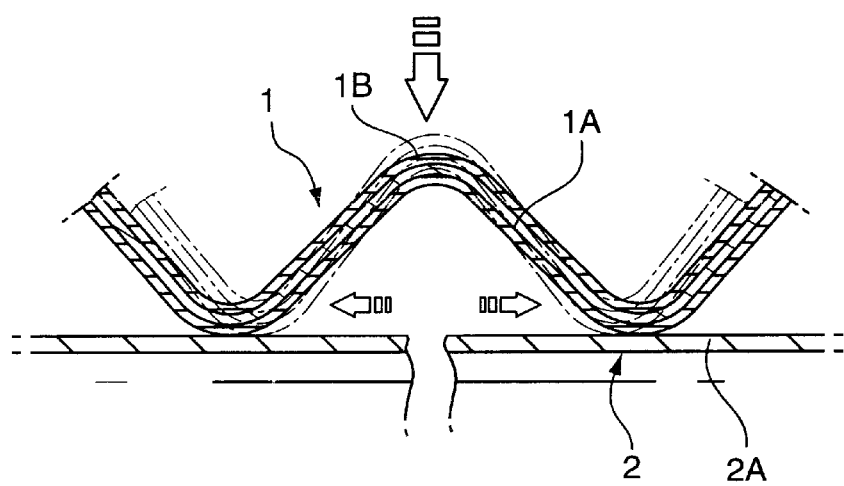
FIG. 1b is a cross-sectional view showing a behavior of a conventional double-walled spiral pipe when loaded.
Figure 2:
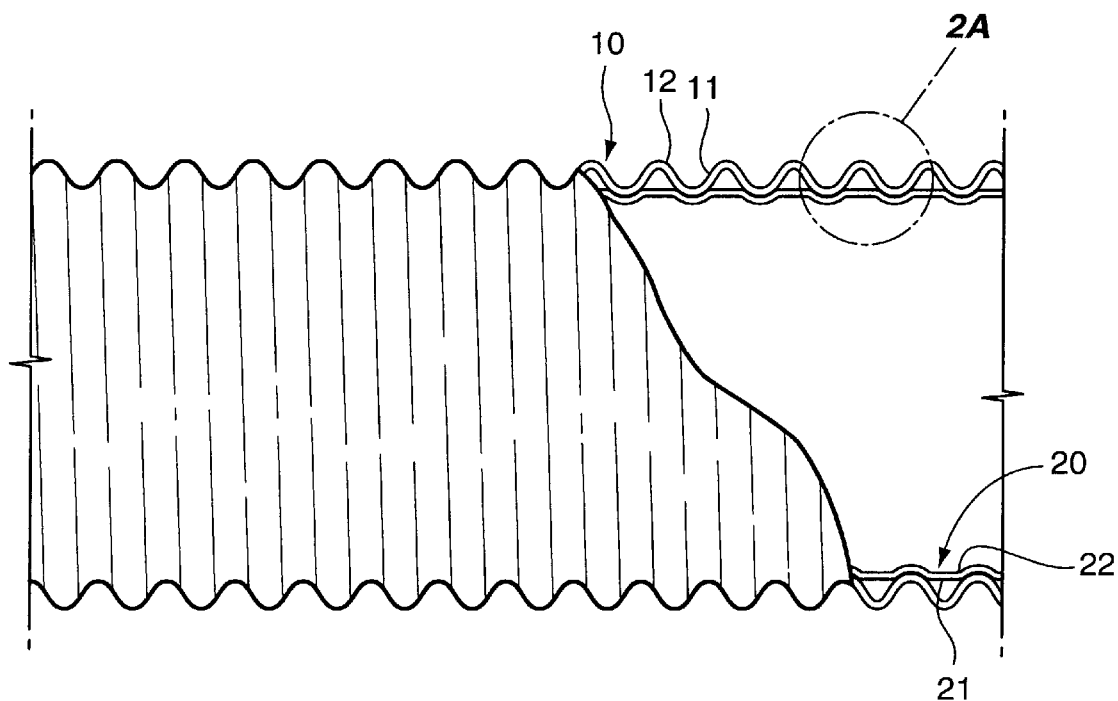
FIG. 2 is a front view, including a partially sectional portion, of a double-walled spiral pipe in accordance with the present invention.
Figure 2A:
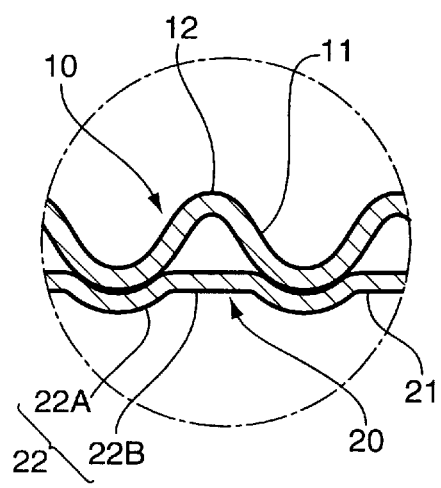
Figure 3A:
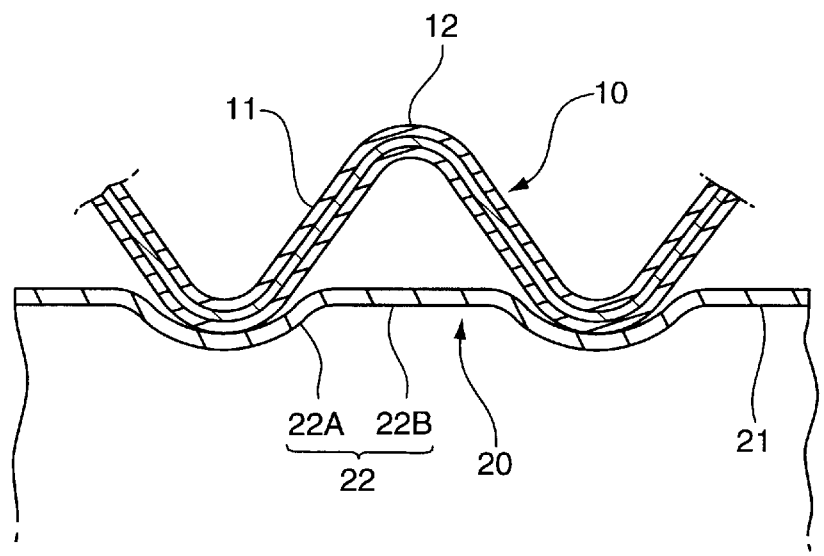
FIG. 3a is a cross-sectional view showing a normal state of the inner wall of FIG. 2.
Figure 3B:
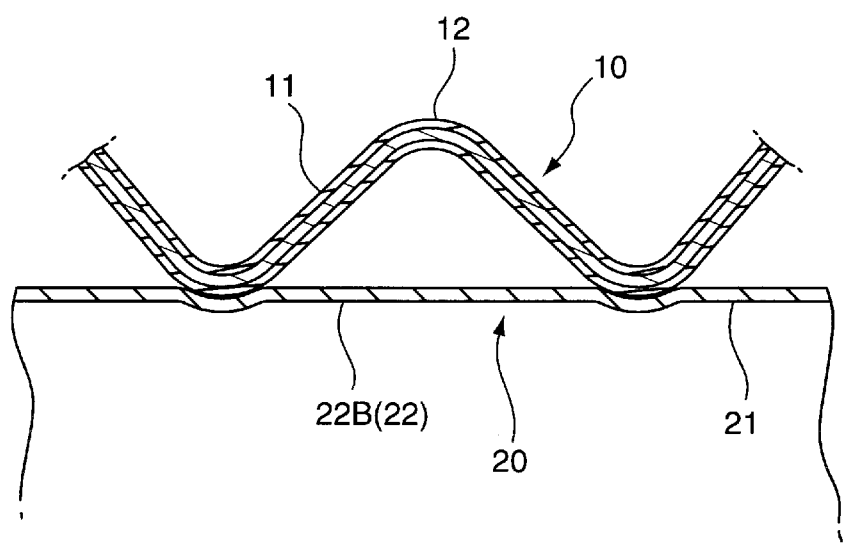
FIG. 3b is a cross-sectional view showing an elongated state of the inner wall of FIG. 2.

A junction portion is formed between the inner wall 20 and the wave bottom 12 of the interior surface of the outer wall 10. The double-walled spiral pipe of the present invention has a semi-circular portion formed at the point of the wave bottom of the corrugations of the outer wall, which is not a simple contact between the wave bottom of the outer wall and the inner wall such as a conventional double-walled spiral pipe. Accordingly, as shown in FIG. 3a and FIG. 3b, although the corrugations 12 of the outer wall 10 is deformed by sectional load, soil pressure or heat, by which a pitch of the corrugations 12 can be wide or narrow, the semi-circular portion 22a of the inner wall 20 is flattened, thereby the inner wall 20 is prevented from a damage or breakage caused by outer factors.

The outer wall 10 has a structure that is formed as a spirally corrugated configuration 12 in order to resist against outer load or soil pressure. In the present invention, the outer wall 10 is prepared such that a steel plate is first corrugated and then coated with a synthetic resin, thereafter the coated steel plate 11 is spirally wound to prepare a cylindrical configuration.

The inner wall 20 having a cylindrical configuration is installed to be contacted with the wave bottom of corrugations of the outer wall 10, and functions to drain a sewage, etc. The inner wall 20 has a semi-circular portion which is formed at the point of the wave bottom of the corrugations of the outer wall, and a plane surface is formed between the semi-circular portions. Accordingly, although corrugations 12 of the outer wall 10 can be easily deformed depending upon a sectional load or soil pressure or heat, by which a pitch of the corrugations 12 can be wide or narrow, the semi-circular portion 22a of the inner wall 20 is flattened, thereby the inner wall 20 is prevented from a damage or breakage caused by outer factors.

Figure 4:
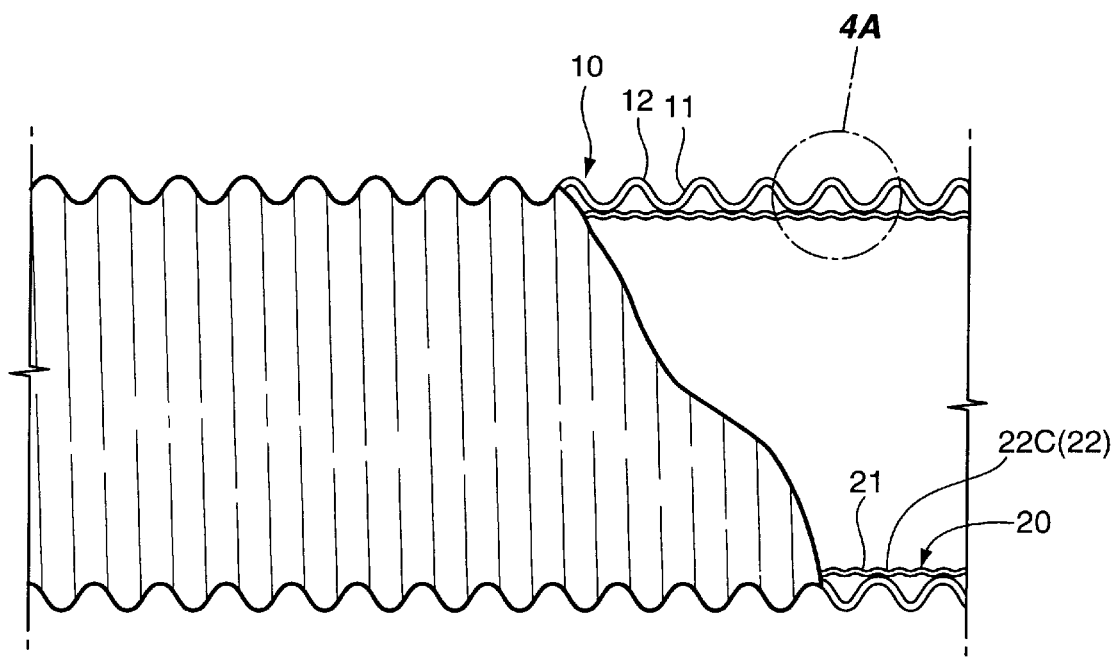
FIG. 4 is a front view, including a partially sectional portion, of another embodiment of the double-walled spiral pipe in accordance with the present invention.
Figure 4A:
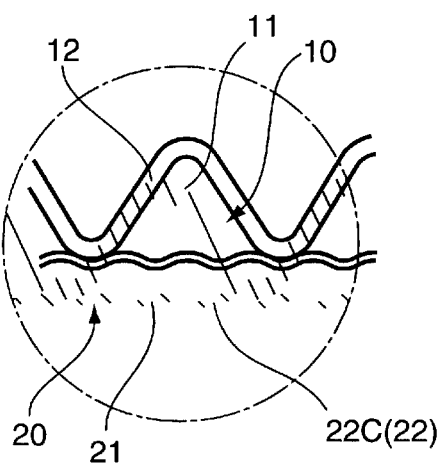
Figure 5A:
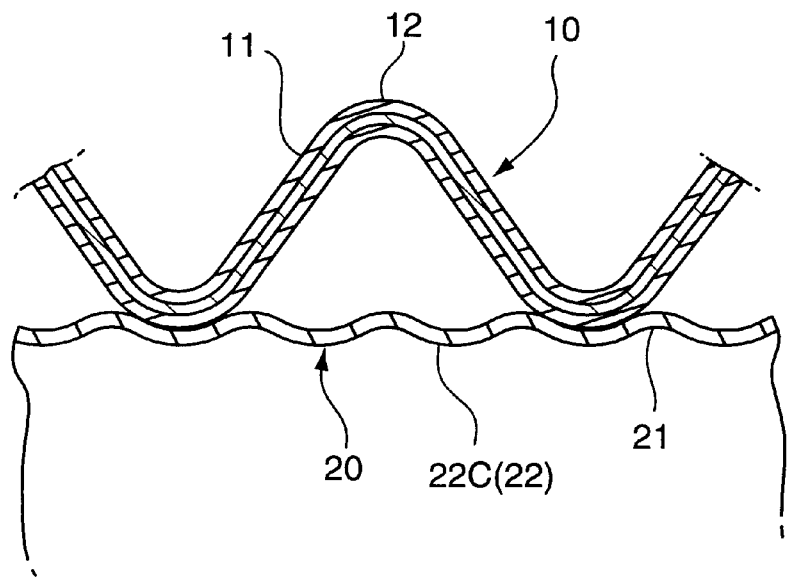
FIG. 5a is a cross-sectional view showing a normal state of the inner wall of FIG. 4.
Figure 5B:
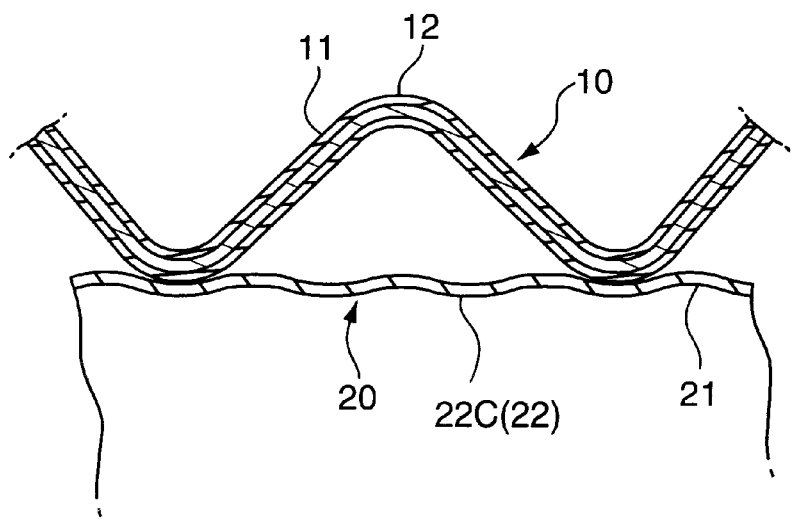
FIG. 5b is a cross-sectional view showing a elongated state of the inner wall of FIG. 4.

FIG. 4 to FIG. 5b show a modified embodiment of the present invention. Small corrugations 22c of the inner wall 20 are formed in the plane surface 22b which is formed between the semi-circular portions 22a. Accordingly, when the corrugations 12 of the outer wall 10 are deformed depending upon a sectional load or soil pressure or heat, the corrugations 12 of the outer wall 10 are contracted or elongated, which effects the inner wall 20. Therefore, the length of the inner wall 20 is controlled by contracting or elongating the small corrugations thereof, thereby a damage or breakage of the inner wall 20 can be prevented.

Figure 6:
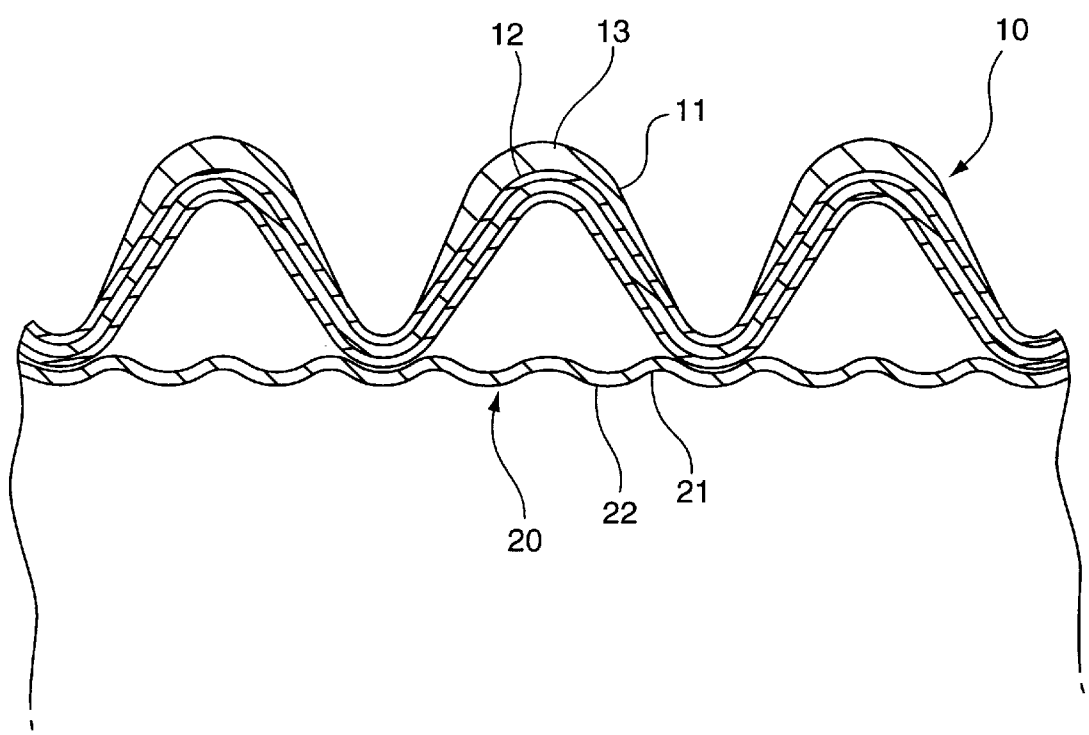
FIG. 6 is a cross-sectional view of further embodiment of the double-walled spiral pipe in accordance with the present invention, wherein a resin layer for protection is formed on the outer wall.

FIG. 6 shows another embodiment of the present invention. A protecting resin-layer 13 is further formed on the wave crest of the corrugations 12 of the outer wall 10. The protecting resin-layer is to minimize the deformation of the corrugations 12 by buffing a sectional load or soil pressure which effects on the outer wall 10.

Figure 7:
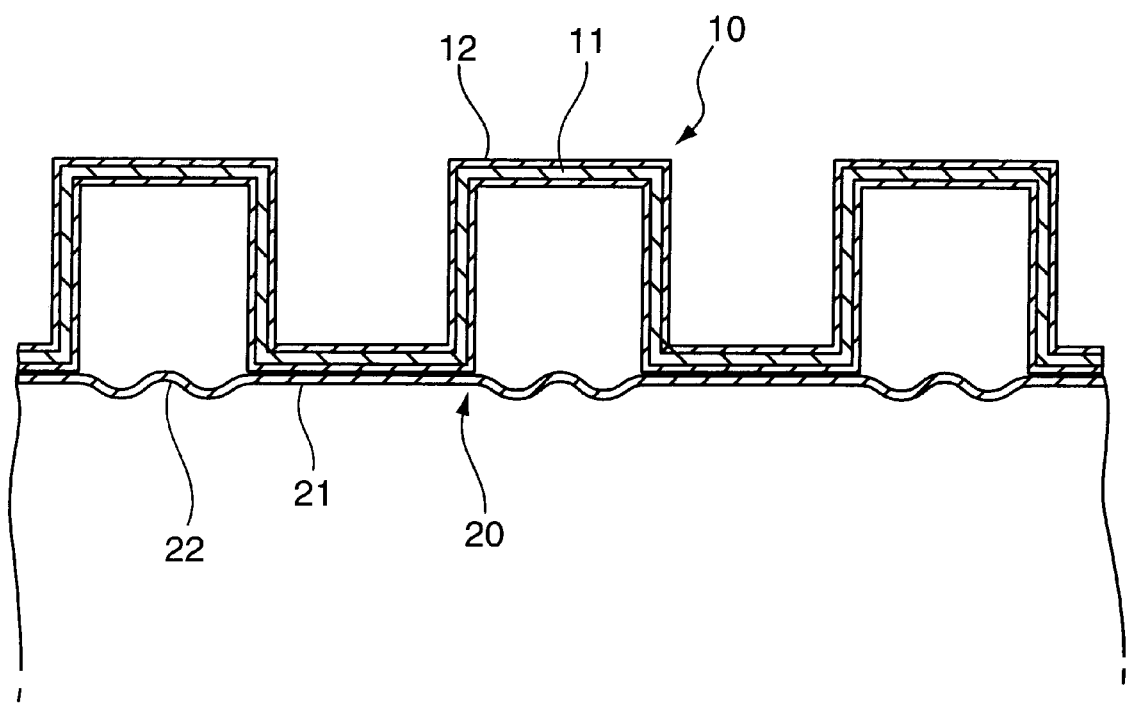
FIG. 7 is a cross-sectional view of other embodiment of the double-walled spiral pipe in accordance with the present invention, wherein the outer wall has a corrugated square shape.

FIG. 7 shows further embodiment of the present invention. The corrugations of the outer wall 10 have a rectangular configuration, not a semi-circular configuration. The inner wall 20 is such that a contacting surface with the rectangular corrugations of the outer wall 10 is plane, and a portion between the rectangular corrugations has small corrugations.

The present invention provides a double-walled spiral pipe which can prevent the breakage or damage of the inner wall by means of a flexibility of the inner wall, in case that the outer wall is deformed, and can lengthen the durability thereof, and can smoothly drain a sewage therethrough.

The present invention can be easily carried out by an ordinary skilled person in the art. Many modifications and changes may be deemed to be within the scope of the present invention as defined in the following claims.

What is claimed is:

1. A double-walled spiral pipe comprising:

an outer wall 10 having a cylindrical shape, said outer wall 10 being prepared by winding spirally a coated steel plate 11 having corrugations 12; and an inner wall 20 having a cylindrical shape, said inner wall 20 being contacted with the wave bottom of the corrugations of said outer wall 10, and comprising semi-circular portions 22a or small corrugations 22c in order to cover the wave bottom of the corrugations of the outer wall such that a plane surface or half small corrugation is formed between said semi-circular portions 22a or other half small corrugations 22c whereby said inner wall 20 can be contracted or elongated depending upon a change of the pitch of the corrugations of said outer wall 10.

2. The spiral pipe as defined in claim 1, wherein further includes a protecting resin-layer which is covered on the wave crest of the corrugations 12 of the outer wall 10.

3. The spiral pipe as defined in claim 1, wherein said corrugations 12 of said outer wall 10 are a rectangular configuration.

\* \* \* \* \*